May 16, 1944. R. HADEKEL ET AL 2,348,974
APPARATUS FOR DAMPING MOVEMENTS OF VEHICLE AND OTHER WHEELS
Filed May 9, 1942 2 Sheets-Sheet 1
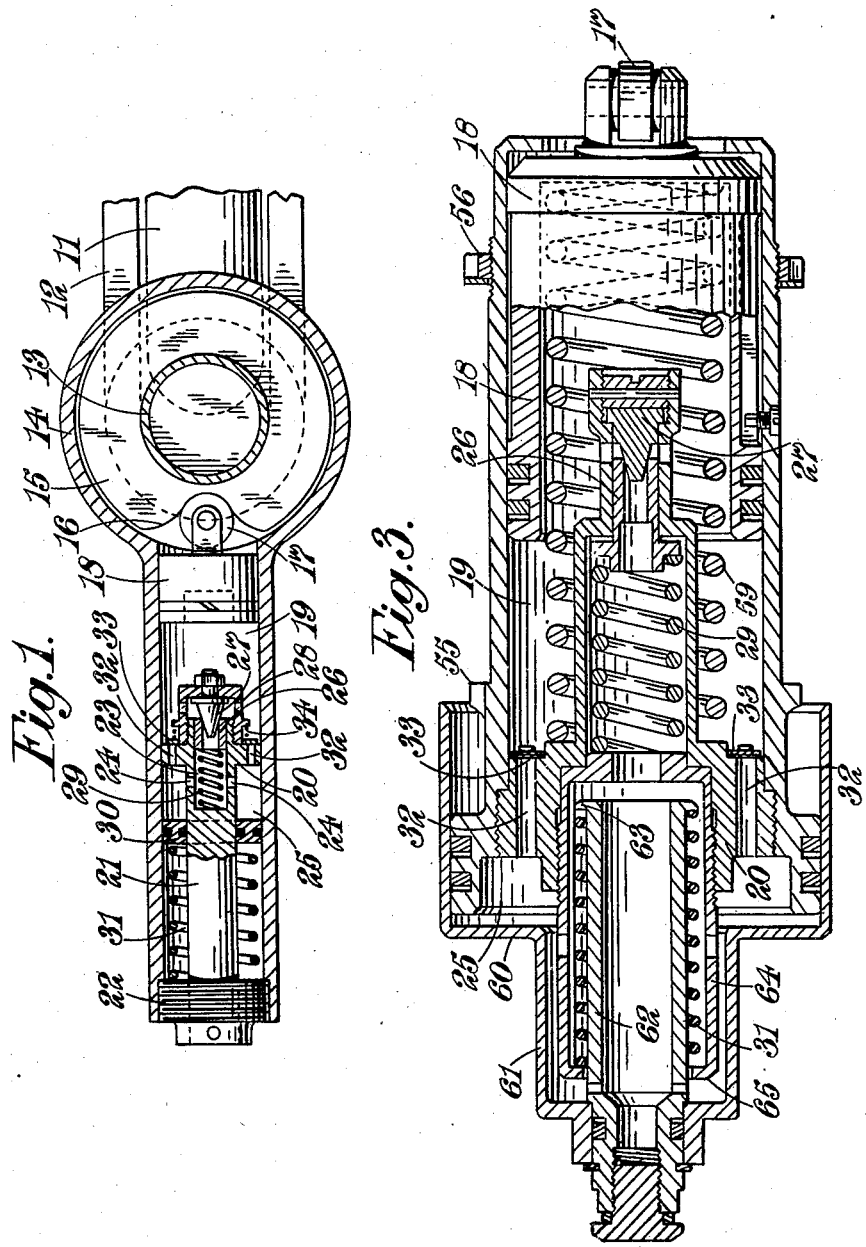
INVENTORS
Ruben Hadekel
Andre A. Perriches
By Watson, Cole, Grindle &
Watson ATTYS

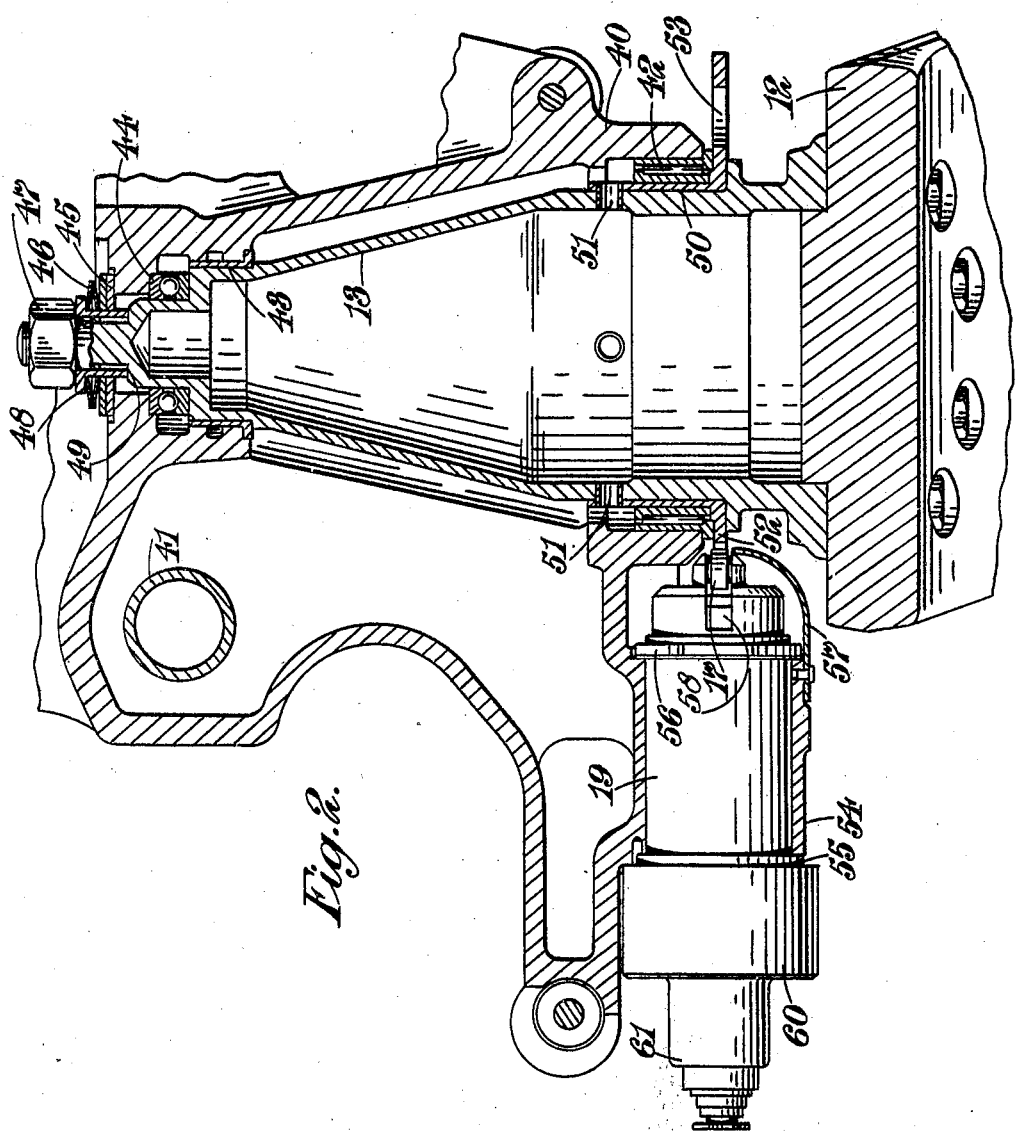

Patented May 16, 1944

2,348,974

UNITED STATES PATENT OFFICE 2,348,974

APPARATUS FOR DAMPING MOVEMENTS OF VEHICLE AND OTHER WHEELS

Ruben Hadekel and André Albert Perriches, Warrington, England, assignors to Associated Messier Investments Limited, Farnham Common, England, a British company Application May 9, 1942, Serial No. 442,344
In Great Britain March 3, 1941

10 Claims. (Cl. 267—1)

This invention comprises improvements in or relating to apparatus for damping movements of vehicle and other wheels.

In wheels for vehicles such as the tail wheels or nose wheels of the undercarriages of aeroplanes and, in fact, in any wheels which are mounted so as to permit angular movement of the wheel to alter its plane there is a tendency for the wheels to oscillate transversely to their plane to an undesirable extent when travelling over the ground. Such oscillation is not uncommon, not only in aircraft undercarriages but also the steering gear of motor cars. It is an object of the present invention to provide a damping apparatus whereby such undesired oscillations are limited or prevented.

Frequently, a wheel having a castor action, or otherwise mounted so as to permit of angular movement to alter the plane of the wheel, is provided with a centering device so as to cause it to return towards a prearranged plane. It is a further object of the invention to combine with a centering device a damping mechanism.

According to the present invention a wheel mounting comprises in combination wheel supporting means such as to permit angular movement of the wheel to alter its plane, a centering member so operatively connected to the wheel as to be displaced whenever the wheel moves from a median plane, a fluid compression device to back up said centering member, means to apply fluid pressure in said fluid compression device to centre the wheel normally in said median plane and means to damp movements of said fluid compression device so as to damp oscillations of the wheel.

The fluid compression device may consist of a piston and cylinder comprising part of a fluid pressure shock absorbing element.

Further features of the invention relate to the shock absorbing element and these features are not limited in their application to the wheel mounting just described.

The invention includes a hydraulic vibration damper comprising a piston and cylinder and an outlet port to the cylinder for fluid such as to restrict the movement of the fluid and produce damping of the piston movement, characterised by the fact that the outlet port is controlled by a valve member such that the port area increases progressively as the valve opens, that pressure in the cylinder tends to open the valve and that the valve is yieldingly supported so that under normal operating conditions it opens to an extent determined by the pressure.

It can be shown mathematically that a damper such that it will completely suppress any oscillation and make a system of linkwork, or other mechanism to which it is attached, aperiodic, should have a damping force directly proportional to the velocity of the mass which is being damped. Friction damping devices offer a constant damping force whereas piston and cylinder damping devices provided with an outlet port to the cylinder of constant area offer a resistance to damping which is proportional to the square of the velocity of the piston relatively to the cylinder. Neither type of damper affords the appropriate conditions to render the parts aperiodic but it is possible to secure aperiodic damping by the mechanism according to the present invention provided that the variation of the orifice port area, which depends upon the pressure in the cylinder, is made to vary according to an appropriate function of the pressure.

Conveniently the valve takes the form of an annular sleeve member with the port passing through the centre of it and the increase of port area as the valve opens is effected by the provision of a conical plug on which the annular valve seats.

The following is a description, by way of example, of wheel-oscillation damping apparatus as applied to a castor wheel of an aircraft undercarriage in accordance with the invention.

In the accompanying drawings—

Figure 1 is a diagrammatic representation of a wheel mounting and centering and damping means therefor as viewed in plan and partly in horizontal section;

Figure 2 is a vertical section through a second form of apparatus;

Figure 3 is a longitudinal section through the damping means of Figure 2.

Referring to Figure 1, 11 represents a wheel which is mounted to rotate in a fork 12 which fork is mounted on a vertical spindle 13. The spindle 13 is rotatably mounted in a casing 14 so that the wheel 11 can act as a castor wheel. Upon the spindle 13 is a centering cam 15 having a centering recess 16 in the side of it which is engaged by a cam roller 17 carried on a piston 18. The piston 18 is normally urged toward the centre of the spindle 13 and thus the wheel 11 is normally centered in a median plane from which it can only depart by forcing the piston 18 rearwardly.

The piston 18 slides in a cylinder 19 which projects radially from the side of the casing 14. The cylinder is closed by a partition 20 carried on a stem 21 which is supported on a screwed plug 22 in the end of the lateral extension which provides the cylinder 19. The partition 20 has a central aperture 23 entering the stem 21 and communicating by lateral ports 24 with a chamber 25 beyond the partition. The opening 23 is closed by a valve 26 which is formed as a cylindrical tubular member and bears against a conical plug 27 carried on a bracket 28 which is screwed to the partition 20. The plug 27 points toward the passage 23 through the partition and the valve member 26 is spring pressed upon it by a spring 29. Thus, when the piston 18 is urged inwardly, hydraulic fluid which fills the cylinder 19 can be forced into the chamber 25 by the pressure produced in the cylinder 19 forcing back the valve member 26 and thus permitting the passage of the fluid.

It will be noted that the opening around the conical plug 27 through the valve member 26 increases as the valve member 26 is forced rearwardly. By varying the taper of the plug 27 any desired damping characteristic relative to the speed of movement of the piston 18 can be provided and this provision for modifying the damping characteristics of the apparatus by varying the shape of the tapered plug is, as already pointed out, an important feature of the present invention.

Around the stem 21 there is a ring-shaped piston 30 which is urged toward the partition 20 by a spring 31. Thus the chamber 25 constitutes an accumulator chamber in which the hydraulic fluid is maintained under pressure by the spring.

In the partition 20 there are apertures 32 which surround the stem portion 21 and the bracket 28 and are closed by a ring valve 33 so that fluid cannot pass through these apertures from the cylinder 19 to the accumulator chamber 25 but passage from the accumulator chamber 25 to the cylinder 19 is easy, as the ring valve is held on its seat only by a light spring 34. Consequently the pressure in the accumulator chamber is transmitted to the cylinder 19 and the piston 18 is kept normally pressed into the recess 16 of the cam 15, thus centering the wheel 11. In operation, should the wheel 11 be deflected from its central position, the piston 18 is forced into the cylinder 19, the valve 26 is opened and fluid is forced into the accumulator chamber 25. Owing to the restrictive action of the valve 26 under the influence of the spring 29 this requires a high pressure in the cylinder 19 and the movement of the wheel 11 is strongly resisted. A smaller force due to the fluid pressure in the accumulator chamber 25 opens the valve 33 so as to return the piston 18 and again centre the wheel. Thus the resisting force is large and the returning force is lighter and so the movement is damped and while the wheel is free to turn in accordance with the requirements of manœuvering the aircraft on which the device is mounted, oscillation is prevented.

If the force exerted on the sleeve-like valve member 26 by the spring 29 is made zero or very small when the valve member is seated the movement of the valve member 26 will be proportional to the pressure-difference between the cylinder 19 and chamber 25 and the orifice area between the valve member 26 and the tapered plug 27 will then be approximately proportional to the square root of the pressure-difference. At very slow speeds of oscillation of the castor wheel which impart slow movements to the piston 18 the damping load is zero, since a negligible load is required to move the valve member 26 backwards. If the speed of the movement of the piston 18 increases the valve member is forced further rearwardly which compresses the spring 29 and although the orifice is now larger the damping effect is greater. By determining exactly the shape of the taper of the plug 27 the damping effect can, if desired, be made precisely proportional to the speed of movement so that the apparatus becomes perfectly aperiodic. When the damping force (i. e., the pressure-difference) is to be exactly proportional to the speed of movement it is clear that the valve opening must be exactly proportional to the square root of the pressure-difference. It goes without saying that any desired variation from perfect aperiodicity can be provided by suitably adjusting the profile of the conical plug 27. Moreover by giving the spring 29 a certain amount of initial compression any desired degree of initial damping load may be provided and therefore the piston and cylinder which act as a vibration damper may have any desired force-velocity characteristic.

Referring now to Figures 2 and 3, these show a more elaborate construction working on the same principle.

In Figures 2 and 3, 12 is a fork similar to the fork 12 of Figure 1 but only the upper part of the fork is shown in the drawings. This is attached to a hollow conical castor-spindle 13 which is supported in bearings in a bracket 40 pivoted at 41 on the frame of an aircraft so that the wheel mounting as a whole can be retracted in known manner when required. The bearings of the castor-spindle 13 comprise a needle-roller bearing 42 close above the fork 12, a plain bearing 43 close to the top of the castor-spindle, a ball thrust race 44 above the bearing 43 to take the weight and a thrust washer 45 to draw the spindle up into the bracket 40. The thrust washer 45 is backed up by a spring washer 46 and a nut 47 on the top of the castor-spindle 13. Interposed between the nut 47 and the spring washer 46 is a distance piece 48 which extends as a sleeve through the washers 46 and 45 and bears on a shoulder 49 formed on the spindle 13, so that the nut 47 cannot be tightened too far.

Within the needle-roller bearing 42 there is a sleeve 50 on the spindle 13, which sleeve is locked to the spindle by hollow rivets 51 and which has a flange around its lower periphery constituting a cam 52. The cam 52 is shaped like the cam 15 of Figure 1. On one side it is extended to form a towing lug 53. On the other side it has a recess to receive a cam roller 17 and the cam roller is mounted on a piston 18 which corresponds to the piston 18 of Figure 1. The piston 18 works in a cylinder 19 as shown in Figure 3. The cylinder 19 is mounted in a bore formed in the under side of the bracket 40 of the undercarriage as shown at 54, Figure 2, and it has a flange 55 bearing on one end of the part 54 and a ring nut 56 which is screwed upon it and pulls up against the other end of the portion 54. The parts are enclosed by a sheet metal guard 57 and in order to permit passage of the cam 52 the end of the cylinder which projects beyond the nut 56 toward the cam 52 is slotted as shown at 58.

The internal parts of the cylinder 19 and the associated damping mechanism are seen in Figure 3. It will be observed that the cylinder 19 is closed by a partition 20 screwed into the end of it and corresponding to the partition 20 of Figure 1. The piston 18 is made long and trunk-shaped and within it, between the head of the piston which carries the cam roller 17 and the partition 20, there is provided a strong return spring 59 which aids in centering the cam 52 in addition to the hydraulic pressure on the piston 18. The partition 20 is extended toward the piston 18 in the centre and this extended portion contains the tubular valve member 26, operating spring 29 for the valve, and conical plug 27, the operation of these parts being similar to that which has been already described in the correspondingly numbered parts in Figure 1. Moreover the partition 20 has ports 32 similar to the ports 32 of Figure 1 and similarly closed by a ring valve 33.

Beyond the partition 20 is an accumulator chamber 25 but in this case the chamber is not formed in an extended portion of the cylinder 19 but is closed by a sliding cap 60 which fits on the end of the cylinder 19 and is extended rearwardly with a hollow cylindrical portion 61 which carries an inwardly projecting tube 62. The tube 62 extends into the cap 60 and into a hollow space formed in the centre of the partition 20. Here it carries a flange 63 which forms a seat for the end of a spring 31 corresponding to the spring 31 of Figure 1. The partition 20 carries a tube 64 which surrounds the tube 62 and extends outwardly to a point where it can carry an inturned flange 65 which forms a seating for the other end of the spring 31. Thus the sliding cap 60 is forced inwardly by the spring 31 and pressure is maintained in the accumulator chamber 25.

The operation of this apparatus is similar to that described in relation to Figure 1 with the exception that the centering action is assisted in this case by the spring 59. The re-arrangement of the parts as compared with Figure 1 results in a more compact construction, and one of lighter weight.

Instead of using a spring such as 31 in the accumulator chamber 25 an air cushion could be employed, if desired.

Instead of employing a cam for operating a roller and thereby moving the sliding piston it is possible to connect the piston to the rotating part of the spindle of the castor wheel by a crank pin carried by the spindle and a connecting rod to the piston. If this is done, moreover, double-acting type of shock-absorber can be used instead of a single cam, one which would enable the size of the parts to be reduced. Other alternative constructions are possible; for instance, it is possible to employ a hollow cam which will draw the piston towards it out of the cylinder instead of pushing the piston away from the centre of the spindle; again, it is possible for the damping action of the shock-absorber to be reversed so that the damping effect occurs when the piston is following up the cam on the return to normal position instead of on the initial movement from normal. This tends to reduce the effort required for steering. Moreover, in the constructions above described the centering spring acts also as a damping spring but the functions of centering and damping could be dissociated and two springs employed.

We claim:

1. A hydraulic resilient control and vibration damper comprising in combination a damping cylinder, a piston therein, an accumulator chamber external to the damping cylinder and piston, a port opening from the space enclosed by the damping cylinder and piston into the accumulator chamber, a spring-closed sliding damping valve for said port opening under pressure in the cylinder, the valve and its seating being tapered axially relatively to one another so that the port area increases progressively with increasing valve opening at a rate determined by the taper, a passage for liquid from the accumulator chamber into the damping cylinder controlled by a non-return valve such as to prevent flow from the cylinder to the accumulator chamber and resilient means for maintaining the liquid in the accumulator chamber under pressure.

2. A hydraulic vibration damper as claimed in claim 1, wherein the valve member takes the form of an annular member movable relatively to a conical plug.

3. A hydraulic vibration damper as claimed in claim 1, wherein the conical plug is so shaped that the damping provided is aperiodic.

4. A hydraulic vibration damper as claimed in claim 1, wherein the outlet port leads into an accumulator chamber from which a fluid may be returned to the cylinder on return of the piston.

5. A hydraulic vibration damper comprising a piston and cylinder and an outlet port to the cylinder for fluid such as to restrict the movement of the fluid and produce damping of the piston movement, the outlet port being controlled by a valve member such that the port area increases progressively as the valve opens, that pressure in the cylinder tends to open the valve and that the valve is yieldingly supported so that under normal operating conditions it is just seated under zero pressure and opens to an extent determined by the pressure, the valve member taking the form of an annular member movable relatively to a conical plug, the outlet port leading into an accumulator chamber from which a fluid may be returned to the cylinder on return of the piston.

6. A hydraulic vibration damper comprising a piston and cylinder and an outlet port to the cylinder for fluid such as to restrict the movement of the fluid and produce damping of the piston movement, the outlet port being controlled by a valve member such that the port area increases progressively as the valve opens, that pressure in the cylinder tends to open the valve and that the valve is yieldingly supported so that under normal operating conditions it is just seated under zero pressure and opens to an extent determined by the pressure, the valve member taking the form of an annular member movable relatively to a conical plug so shaped that the damping provided is aperiodic, and the outlet port leading into an accumulator chamber from which a fluid may be returned to the cylinder on return of the piston.

7. A hydraulic vibration damper as claimed in claim 6, wherein alternative ports closed by a non-return valve are provided to permit return of fluid from the accumulator chamber to the cylinder upon return movement of the piston.

8. A hydraulic vibration damper as claimed in claim 6, wherein return movement of the piston is assisted by a spring.

9. A hydraulic vibration damper as claimed in claim 6, wherein the accumulator chamber is provided with a cap-member slidably mounted on the end of the cylinder and yieldingly urged toward the cylinder by a spring.

10. A hydraulic vibration damper as claimed in claim 6, wherein the accumulator chamber is provided with a cap-member slidably mounted on the end of the cylinder and yieldingly urged toward the cylinder by a spring located within the cap-member between concentric tubular projections, one from the interior of the cap-member toward the cylinder and the other from the end of the cylinder toward the cap-member.

RUBEN HADEKEL.
ANDRÉ ALBERT PERRICHES.